UNITED STATES PATENT OFFICE.

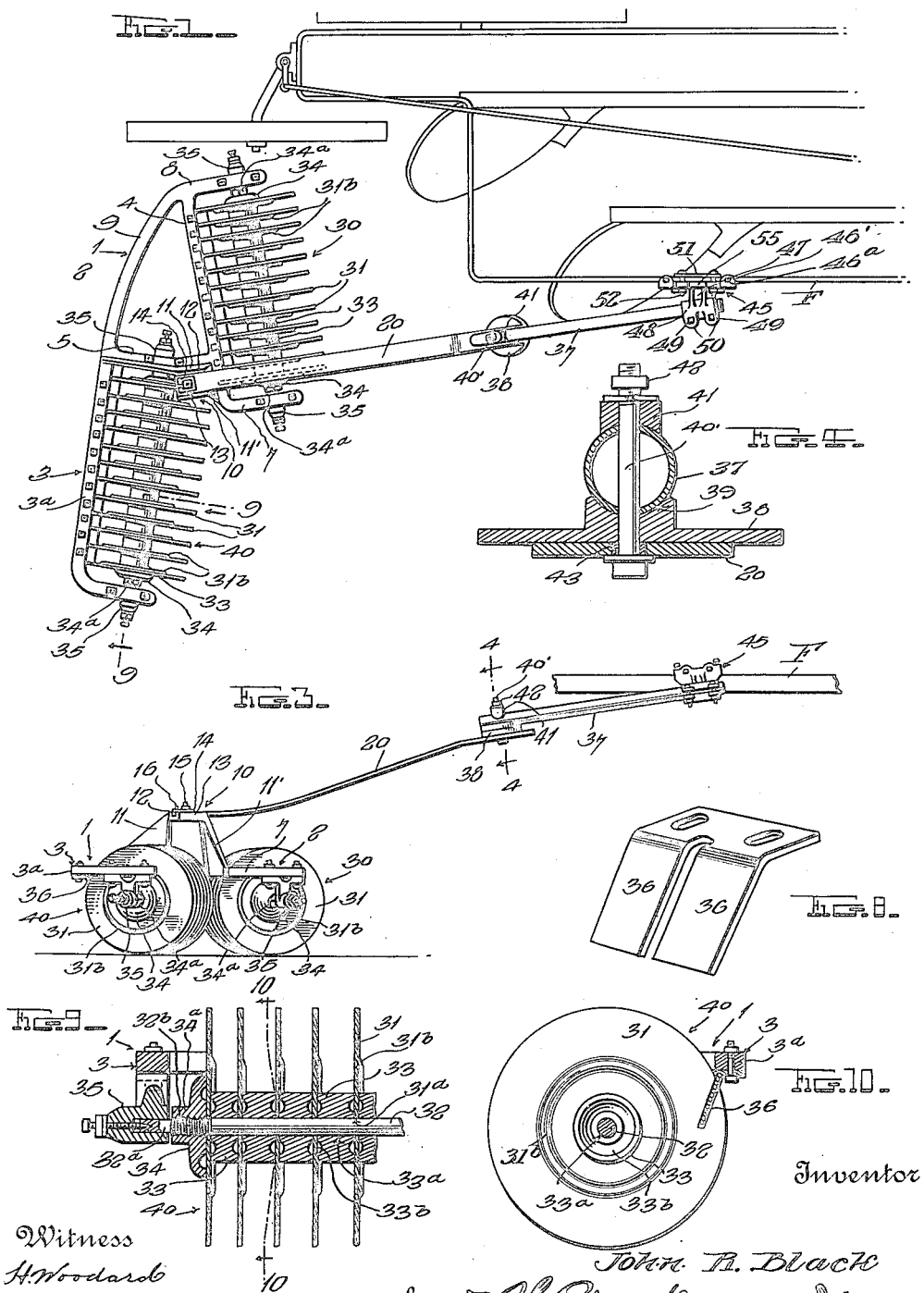

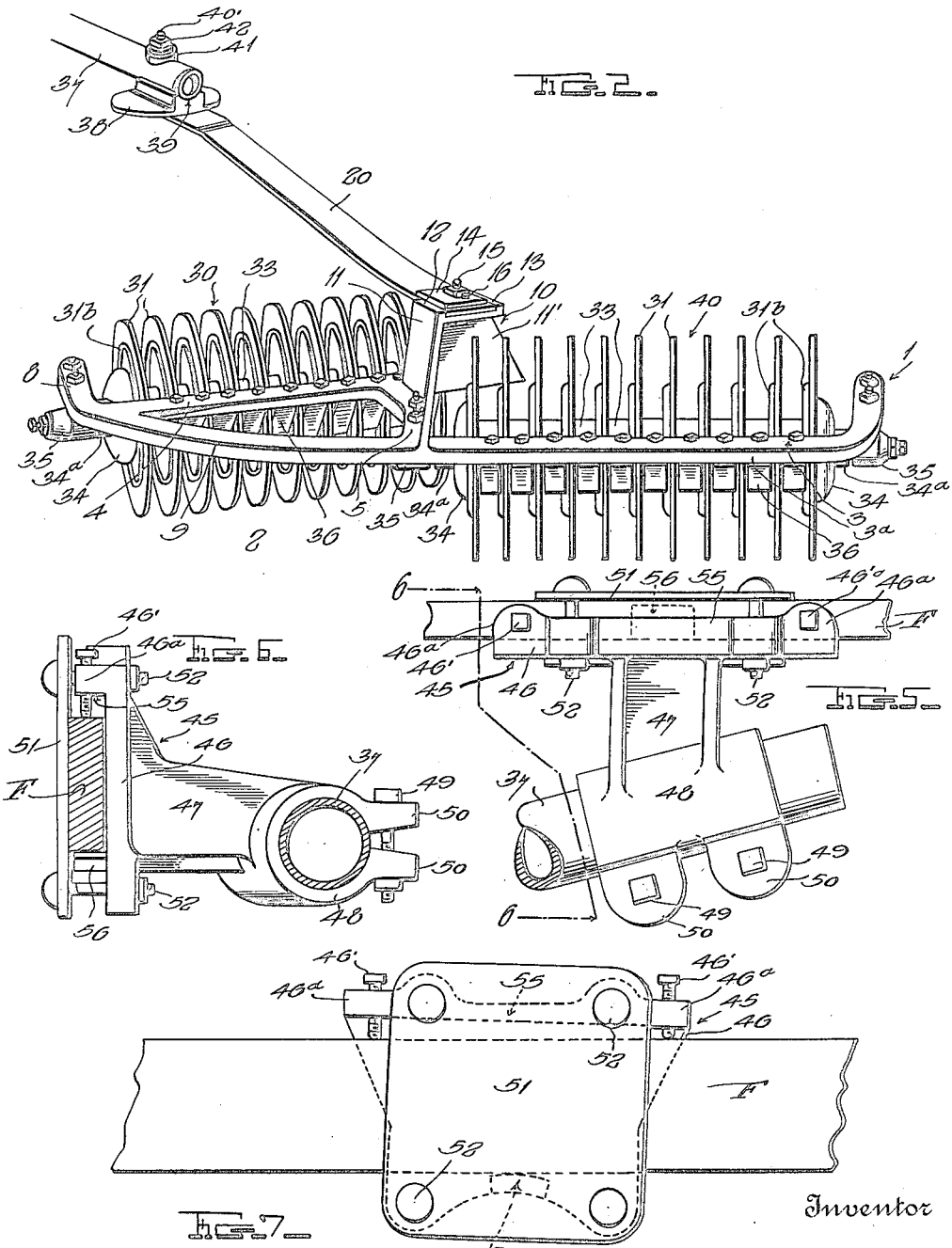

JOHN RANDALL BLACK, OF TOULON, ILLINOIS.

LEVELING AND MULCHING ATTACHMENT FOR PLOWS.

1,225,400.  Specification of Letters Patent.  Patented May 8, 1917.

Application filed June 5, 1916. Serial No. 101,807.

*To all whom it may concern:*

Be it known that I, JOHN RANDALL BLACK, a citizen of the United States, residing at Toulon, in the county of Stark and State of Illinois, have invented certain new and useful Improvements in Leveling and Mulching Attachments for Plows; and I do declare the following to be a full, clear, and exact description of the invention, such as will enable others skilled in the art to which it appertains to make and use the same.

This invention relates to agricultural implements and more particularly to mulching or pulverizing attachments for plows.

The principal object of the invention is to construct an attachment of this character, the weight of which is reduced to a minimum while having a maximum degree of effectiveness.

Another object of the invention is to provide simple and efficient means for connecting the attachment proper to a draw bar whereby the attachment is permitted to swing laterally in either direction and yet be held frictionally against wabbling while in operation.

Another object of the invention is to provide simple and efficient means for exerting a downward yielding pressure on the attachment when in use so that the pulverizing elements thereof will be held yieldably in engagement with the surface over which they are being drawn.

Still another object of the invention is to provide improved means for connecting the draw bar to a plow beam whereby a maximum adjusting surface is acquired at the rear end of the beam.

With these and other objects in view, the invention resides in certain novel features of construction, and the combination and arrangement of parts which will be hereinafter fully described and claimed.

In the accompanying drawings:

Figure 1 represents a plan view of a portion of a plow equipped with this improved attachment;

Fig. 2 is a perspective view of the attachment detached;

Fig. 3 is a side elevation thereof attached;

Fig. 4 is a transverse section taken on the line 4—4 of Fig. 3;

Fig. 5 is a top plan view of the clamp for connecting the attachment to the plow beam;

Fig. 6 is a transverse section taken on the line 6—6 of Fig. 5;

Fig. 7 is a rear elevation thereof;

Fig. 8 is a detail perspective view of one of the cleaning fingers;

Fig. 9 is a detail longitudinal section taken on the line 9—9 of Fig. 1; and,

Fig. 10 is a transverse section taken on the line 10—10 of Fig. 9.

The attachment constituting this invention comprises a drum supporting frame 1 composed of two rigidly connected open sections 2 and 3 here shown U-shaped with the cross bar 4 of section 2 fixedly connected to the free end of the inner arm 5 of the section 3 at a point adjacent the arm 7 of section 2. An arcuate bar 9 is connected at one end to the section 3, the inner end of its arm 5 being preferably made integral with said bar, and said bar 9 is connected at its other end with the section 2 at the junction of the arm 8 thereof with the cross bar 4, and is shown made integral with said section.

Thus it will be seen that I have provided a frame of a particular construction involving two substantially U-shaped sections disposed one in the rear of the other and having diverging axes, one end of the forward section being disposed adjacent the opposite end of the rear section and the inner ends of both sections being arranged in advance of their outer ends.

A supporting platform or deck 10 is arranged at the center of the frame 1 and is preferably formed integral with a web-like standard 11 rising from the arm 5 of the frame section 3 and cast integral therewith, although it need not necessarily be so formed. Another standard 11′ which assists in supporting the platform or deck 10 is mounted on the cross bar 4 of the frame section 2 as is shown clearly in Figs. 1 and 2. This platform 10 is provided on its upper face at its opposite side edges with upstanding ribs or flanges 12 and 13 between which is formed a seat for receiving one end of a plate spring 20. This spring 20 is of a width corresponding approximately to the distance between the ribs 12 and 13, and the thickness thereof as shown is equal to the height of said ribs, said ribs serving to hold the spring against lateral movement when in operative position. A reinforcing and clamping plate 14 is disposed on the upper face of the end of the spring which is seated on the platform 10 and a bolt 15 extends through the platform 10, spring 20, and plate 14 and serves to connect these members together, the usual nut being employed for this purpose. A stud 16 projects upwardly from the deck 10 and extends through registering apertures in the end of the spring and in the plate 14 to assist in holding said members against lateral movement. This spring 20 is designed for connecting the frame 1 with the draw bar to be described and is adapted to exert downward yielding pressure on said frame 1 for holding the pulverizing cylinders or drums thereof in operative engagement with the surface being treated. This spring 20 is rectilinear throughout the greater portion of its length but will necessarily be sprung somewhat to permit its attachment to the deck. This will however result in a merely slight tension rather than an actual set in the spring. The front end of the spring 20 is bent at the rear of its point of attachment of the swivel to afford additional pressure on the frame when the plow to which the attachment is attached enters the ground.

Mounted in the sections 2 and 3 of the frame 1 are pulverizing cylinders or drums 30 and 40 which are constructed as light as possible commensurate to the strain to which they are subjected. These drums are exactly alike and hence only one will be described in detail. Each of these cylinders or drums is composed of a plurality of flat disk-shaped plates 31 each provided with a centrally disposed shaft receiving aperture 31ª and preferably with an annular strengthening rib 31ᵇ here shown formed by corrugating the plate.

These disks 31 are strung on a shaft 32 which extends throughout the length of the drum and projects beyond the opposite ends thereof to form journals 32ª adapted to be supported in bearings 35 on the arms of the frame sections (see Figs. 1, 2, and 9). Mounted on the shaft 32 between the disks 31 are spacing elements in the form of spools 33 which may be of any length desired according to the distance it is desired to space the disks. These spools 33 are provided on their opposite faces between their bores 33ª and their perimeters with annular recesses 33ᵇ which serve to lighten without detracting from the strength of the spools and also provide ample disk engaging surfaces.

The shaft 32 is threaded at its opposite ends at the inner ends of the journal portions 32ª thereof as shown at 32ᵇ for engagement by preferably combined clamping plates and burs 34. These plates 34 have angular wrench receiving projections 34ª on their outer faces and their inner faces are recessed as shown at 34ᵇ to lighten them. It will thus be obvious that after the disks 31 and spools 33 have been strung in alternation on the shaft 32 with two disks at the ends of the series that the clamping plates 34 are then screwed up on the threaded portions 34ª of the shaft, thereby forcing the disks and spools arranged between them into clamping engagement, forming substantially a unitary member composed of the shaft, disks, spools and clamping plates so that they revolve as a single unit.

The bearings 35 on the arms of each section are arranged in longitudinal alinement and when the cylinders 30 and 40 are mounted therein the axes of these cylinders diverge forwardly at an angle of about ten degrees more or less to provide for the free revolution of the cylinders and for sidewise crowding or scraping of the earth during the forward movement of the attachment.

The radially extending longitudinally spaced disks form scraping blades having upright side walls providing between them annular earth receiving chambers which are designed to receive the earth which is crowded thereinto when the attachment is drawn over a plowed field.

Secured to the cross bar 4 of section 2 and the cross bar 3ª of section 3 are a plurality of cleaning fingers 36 which are here shown connected to said bars by bolts. These fingers 36 preferably have squared ends which project between the plates 31 of the cylinders or drums 30 and 40 and are designed on the turning of the cylinders to force out the earth which has accumulated therein within a certain distance of the perimeter of the drum as it revolves, thus producing a fine mulch which drops down on the surface over which the machine is passing and conserves the moisture contained in said surface.

The cylinder supporting frame 1 is connected with the plow frame F and held yieldably in engagement with the earth over which it is to be drawn by means of the spring plate or bar 20 hereinbefore described in connection with a draw bar 37, the length of which may be varied according to the distance which it is desired to position the frame at the rear of the plow.

This draw bar 37 has a swiveled connection with the plate spring or bar 20 which comprises a disk-like plate 38 having a seat 39 extending across its outer or upper face and in which the rear end of the bar 37 is designed to fit, said bar being here shown in the form of a pipe and the seat being correspondingly curved to receive it. The lower face of this connecting disk 38 is preferably flat and the outer free end of the spring bar 20 extends entirely across said flat face and engages it so that frictional contact is formed between the spring and the plate when said spring is connected to the plate by means now to be described. A bolt 40' extends through the spring 20, plate 38, and draw bar 37 and has a sleeve 41 arranged on its upper end between the nut 42 and the draw bar, the lower or inner end of said sleeve being curved to conform to the shape of the draw bar and its outer face flat to present a reliable clamping face for the nut 42. Arranged on the bolt 40' below the disk 38 in the bolt opening of the spring 20 is a roller 43 which operates to permit the turning of the spring relatively to the plate 38. When the draw bar is so connected with the spring 20 and the spring drawn up by the bolt 40' as shown in Fig. 4, a very firm and perfect swivel is formed between the spring and plate which permits turning in either direction of the frame to which the spring is connected when force is applied thereto, but prevents said frame from turning freely on its pivot and wabbling when being drawn forward.

The draw bar 37 is provided at its front end with a clamp 45 for connecting it to the frame of a plow. This clamp comprises a plow frame engaging plate 46 having a laterally projecting arm 47 on one face thereof which carries at its free end a split sleeve 48 in which the free front end of the draw bar 37 is designed to be mounted and rigidly secured thereto by bolts 49 which pass through laterally extending apertured lugs 50 formed on the edges of the split sleeve as is shown clearly in Figs. 5 and 6, the plate, arm and sleeve being preferably all cast in one piece.

Another plate 51 is designed to engage the opposite face of one member of the plow frame and between it and the plate 46 said member is designed to be clamped by bolts 52, four of which are here shown. In addition to these four clamping bolts, two set bolts 46' are provided at the top of the plate 46 and extend through laterally projecting lugs 46ª formed on the rear face of said plate at its upper edge and are designed to engage the top of the frame member to which the clamp is applied. A flange 55 extends laterally from the rear face of plate 46 between the lugs 46ª in alinement therewith and is designed to rest on the upper face of the frame member to which the clamp is secured. A flange 56 which is arranged on the rear face of said plate 46 at its lower edge is designed to engage the lower face of the plow frame member. This flange 56 is arcuate in form with convex upper faces engaging the lower face of the beam F, (see Fig. 7), and forming with the bolts 46' a three point suspension for said beam by means of which the draw bar 37 connected therewith may be vertically adjusted as shown in Figs. 3 and 7 to vary the tension of the spring 20 so that greater or less pressure may be exerted thereby on the deck 10 and transmitted to the pulverizing drums.

When this attachment is connected with the plow frame in the manner above described, the entire draw bar including the spring 20 will travel in a sidewise direction when the plow to which it is attached moves forward in a straight line, and this sidewise movement is effected owing to the peculiar positioning of the pulverizing drums or cylinders in the supporting frame 1.

In the use of this attachment when applied to a plow, the drums or cylinders 30 and 40 being positioned with their axes diverging toward the front, causes the plates or blades 31 to exert a scraping or leveling action on the plowed earth without causing undue friction on the drums and at the same time the chambers formed between said plates accumulate the earth so scraped and this earth is retained therein until ejected by the scraping fingers 36 which force it out in a pulverized condition, thus cleaning the outer portions of the chambers on each revolution of the drums and forming a mulch which is spread over the surface over which the drums are drawn.

The connection of the spring 20 with the center of the frame 1 causes it to exert a uniform pressure on said frame which is distributed to the pulverizing drums 30 and 40 and by so mounting the spring it not only performs the function of a frame depressing member but also operates as a connector for the draw bar 37 forming substantially an extension thereof.

I claim:

1. An attachment of the class described comprising a supporting frame, earth working means carried by said frame, a draw bar, and a plate spring fixed at one end to said frame and swiveled at its other end to said draw bar.

2. An attachment of the class described comprising a supporting frame, earth working means carried by said frame, a draw bar, a plate spring fixed at one end to the center of said frame and swiveled at its other end to said draw bar.

3. An attachment of the class described comprising a supporting frame, earth working elements carried by said frame, a platform rising from the center of said frame, a draw bar, and a plate spring fixed at one end to said platform and swiveled at its other end to said draw bar to provide for the lateral swinging of said frame.

4. An attachment of the class described comprising a supporting frame, earth working elements carried by said frame, a draw bar, a plate fixed to said draw bar, a spring metal bar secured at one end to said frame and extending under said plate and pivotally connected to swing laterally relatively to said draw bar, the contacting faces of said plate and spring frictionally engaging.

5. An attachment of the class described comprising a supporting frame, pulverizing elements carried by said frame, a draw bar, a disk-shaped plate fixed to said draw bar, a spring metal bar secured at one end to said frame and extending under said plate and pivotally connected to swing laterally relative to said draw bar, said plate having a flat lower face across which said spring metal bar extends and engages, a bolt extending through said spring bar, said plate and draw bar, and a roller on said bolt in the aperture of said spring bar.

6. A device of the class described including a frame comprising a pair of substantially U-shaped sections disposed one in the rear of the other and diverging from each other with one end of the forward section disposed adjacent the opposite end of the rear section, cylinders revolubly mounted in said sections with their axes diverging, a support rising from the center of said frame between said sections, a plate spring fixedly engaged with the upper end of said support and projecting forwardly in a plane substantially at right angles to the axes of the front cylinder, and a draw bar pivotally connected with the free end of said spring.

7. An attachment of the class described comprising a supporting frame, pulverizing elements carried by said frame, a platform rising from the center of said frame, laterally spaced projections on said platform forming a seat between them, a plate spring having one end fitting in said seat and held therein against lateral movement by said projections, means for securing said spring in said seat, and a draw bar swiveled to the other end of said spring.

8. An attachment of the class described comprising a supporting frame, pulverizing means carried by said frame, a draw bar, and a plate spring fixed at one end to said frame and swiveled at its other end to said draw bar, said spring being preferably bent adjacent its swiveled end and rectilinear throughout the remainder of its length.

9. A device of the class described including a frame comprising a pair of substantially U-shaped sections disposed one in the rear of the other and diverging from each other with one end of the forward section disposed adjacent the opposite end of the rear section, cylinders revolubly mounted in said sections with their axes diverging, standards rising from the inner arm of the rear section and the cross bar of the front section, a platform carried by said standards, upstanding laterally spaced ribs on said platform forming a seat opening toward the front of the frame, said seat having an aperture therein and a stud projecting upwardly therefrom, a plate spring having one end mounted in said seat and provided with apertures registering with the aperture and stud of the seat when in operative position, a bolt extending through registering apertures in said seat and spring, and a draw bar having swiveled connection with the other end of said spring.

In testimony whereof I have hereunto set my hand in the presence of two subscribing witnesses.

JOHN RANDALL BLACK.

Witnesses:
 Roy D. Kidd,
 John W. Walter.